No. 864,497.  
PATENTED AUG. 27, 1907.

E. T. WRIGHT & C. LONGENECKER.  
ROAD SCARIFIER.  
APPLICATION FILED NOV. 3, 1906.

2 SHEETS—SHEET 1.

Witnesses  
Inventors  
Charles Longenecker, and  
Edward T. Wright  
by Robert Watson  
Attorney.

No. 864,497. PATENTED AUG. 27, 1907.
E. T. WRIGHT & C. LONGENECKER.
ROAD SCARIFIER.
APPLICATION FILED NOV. 3, 1906.
2 SHEETS—SHEET 2.
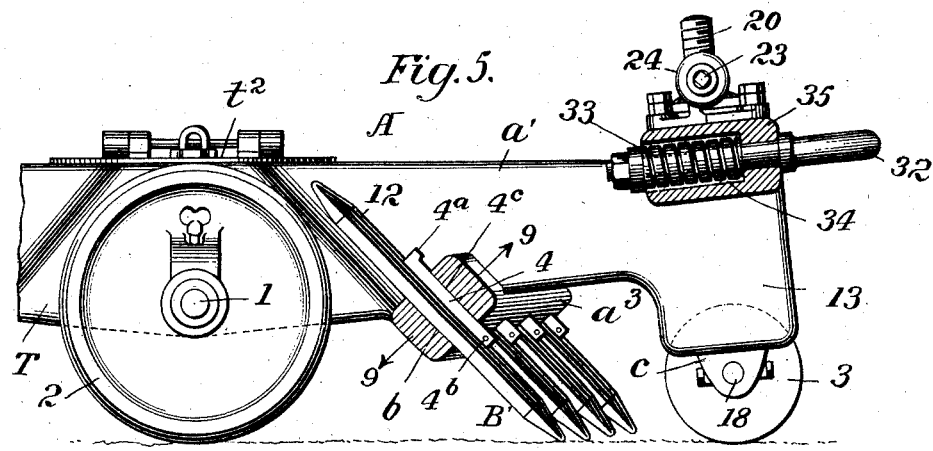
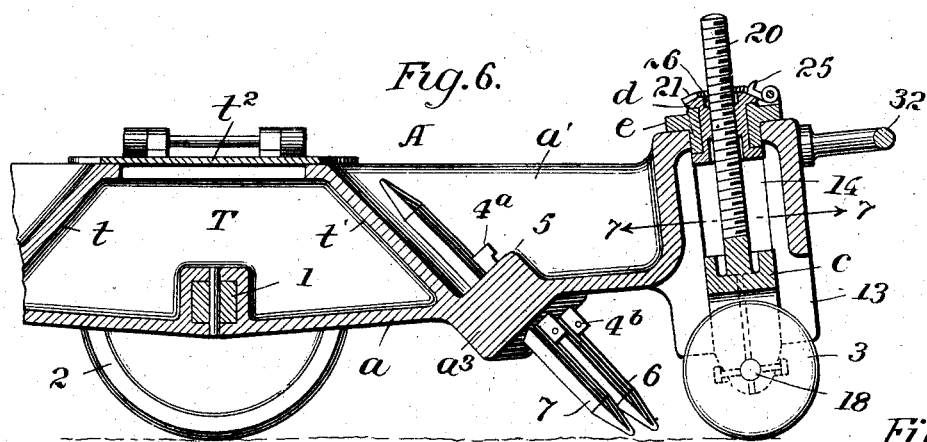
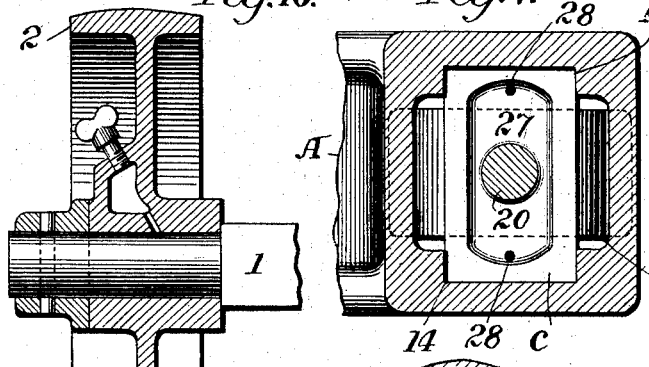
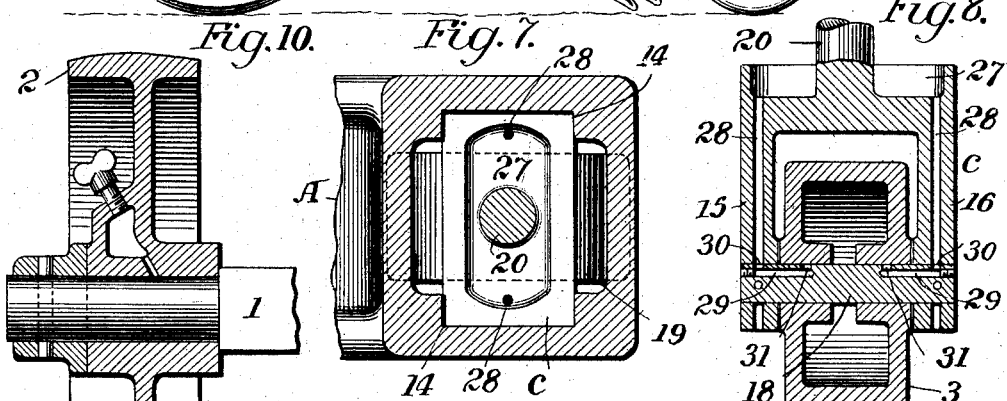
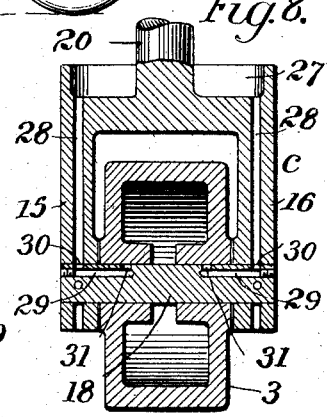
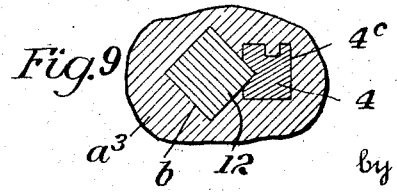
Witnesses
Inventors
Charles Longenecker, &
Edward T. Wright
by
Robert Watson
Attorney

UNITED STATES PATENT OFFICE.

EDWARD T. WRIGHT AND CHARLES LONGENECKER, OF NEW YORK, N. Y., ASSIGNORS TO CHARLES LONGENECKER & COMPANY, OF NEW YORK, N. Y., A CORPORATION OF NEW YORK.

ROAD-SCARIFIER.

No. 864,497.  Specification of Letters Patent.  Patented Aug. 27, 1907.

Application filed November 3, 1906. Serial No. 341,830.

*To all whom it may concern:*

Be it known that we, EDWARD T. WRIGHT, a subject of the King of Great Britain, and CHARLES LONGENECKER, a citizen of the United States, both residing at the city of New York, borough of Brooklyn, in the county of Kings and State of New York, have invented certain new and useful Improvements in Road-Scarifiers, of which the following is a specification.

Figure 1:
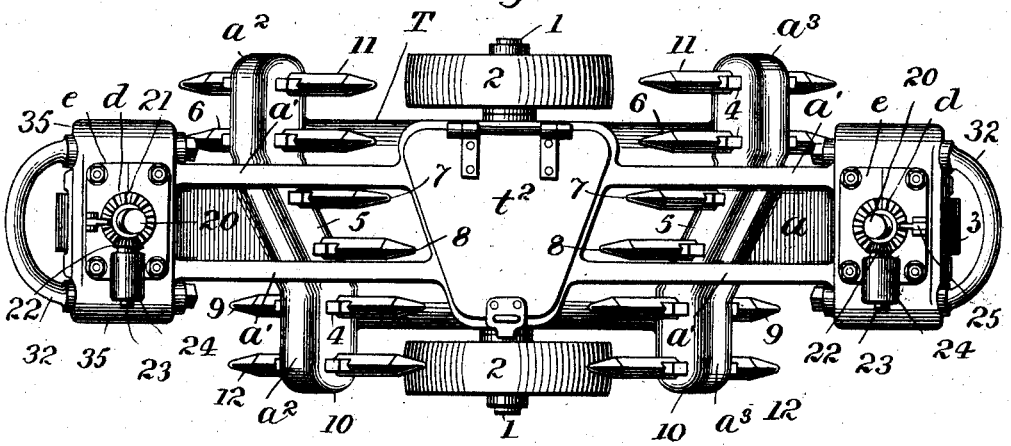
Figure 2:
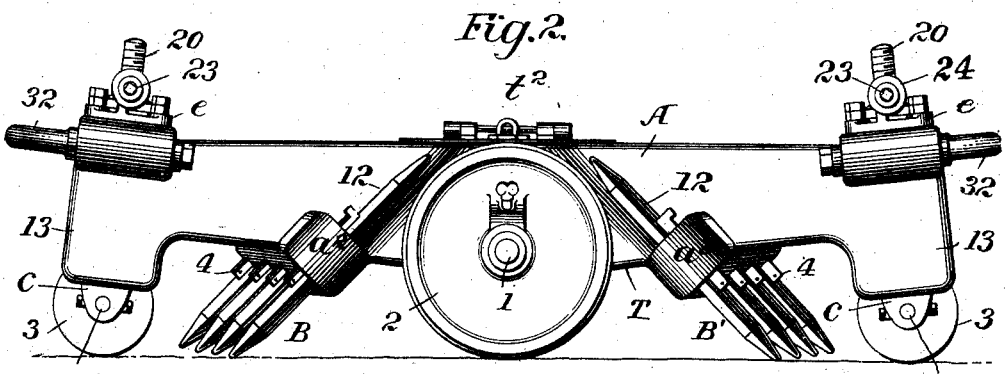
Figure 3:
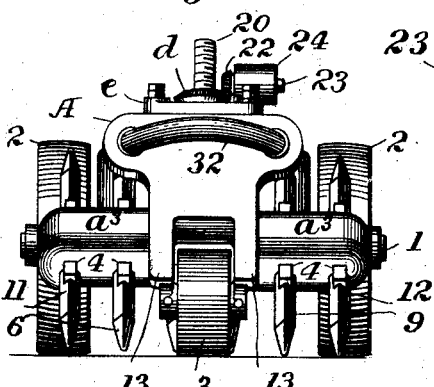
Figure 4:
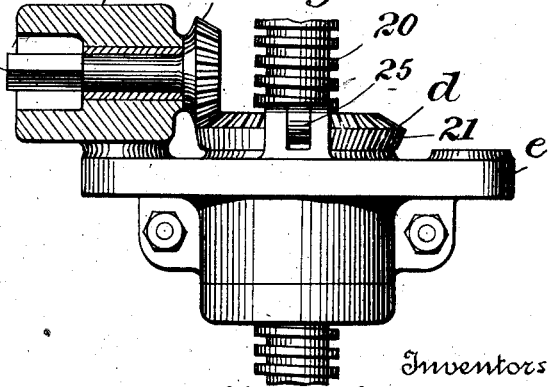

Our invention comprises improvements in road scarifiers the details of which will be pointed out in the following specification, taken in connection with the accompanying drawing in which, Figure 1 is a top plan view of the scarifier; Fig. 2 is a side elevation of the same; Fig. 3 is an end view of the same; Fig. 4 is a detail view of the bearing for the nut which operates the adjusting screw; Fig. 5 is a side elevation of part of the scarifier, portions being shown in section; Fig. 6 is a longitudinal section through a part of the scarifier; Fig. 7 is a section on the line 7—7 of Fig. 6; Fig. 8 is a section through one of the wheels and its yoke, on the line 8—8 of Fig. 7; Fig. 9 is a section through one of the picks, on the line 9—9 of Fig. 5, and, Fig. 10 is a central section through one of the central supporting wheels.

Referring to the drawing, A indicates the frame of the machine, consisting of an elongated iron casting which is supported midway between its ends upon a transverse axle 1 and wheels 2, and is provided with vertically adjustable wheels 3 at its ends. The frame has a bottom web $a$ extending from end to end of the machine, bars or webs $a'$ extending upward from the web $a$, at each side, and a hollow inclosure T at its central portion which forms a box for holding tools or ballast. The web $a$ forms the bottom of the box, and the ends, $t$, $t'$ of the box slope downwardly in opposite directions from the top of the machine towards its ends. The ends of the box also extend outwardly beyond the side webs $a$ and converge toward one side of the frame. A suitable cover $t^2$ is provided for the box.

Heavy cross-bars, $a^2$ and $a^3$ are located in the bottom of the machine adjacent to the ends of the tool box. These cross-bars have angular openings or tool slots $b$ extending through them and sloping in the same direction as the ends of the tool box. Two series of picks $b$, and $b'$ are arranged in the openings in the bars $a^2$ and $a^3$ respectively, and these picks are held in position by keys 4, fitting within keyways $4^c$ which also extend through the bars parallel with the openings $b$, one side of each keyway connecting with one corner of the adjacent tool slot, as shown in Fig. 9, so that when the pick and key are in position a corner of the pick projects into the keyway through the contracted openings $4^d$ and is engaged by one side of the key. When the pick is removed, it will be seen that the key cannot fall through the contracted opening or passageway into the tool slot. The keys are provided with integral heads $4^a$ at their upper ends and removable pins $4^b$ at their lower ends which prevent the keys from moving longitudinally out of the keyways when the picks are removed.

The central portions 5 of the cross-bars extend diagonally across the frame parallel with the ends of the tool box, and the picks 6, 7, 8, and 9 of each series are stepped one in advance of the other, as shown. Ordinarily only these four picks of each series are used; but for the purpose of tearing up the roadbed close to the curb or other fixed object, the end portions 10 of the cross bars are extended outward for some distance beyond the sides of the main frame, so that additional picks 11 and 12 may be inserted therein, in line with the wheels 2.

The picks shown in the drawing are long and pointed at each end, so that they may be reversed, and it will be noted that owing to the inclination of the ends of the tool box and the arrangement of the cross bars at the ends of the box, the picks may be inserted and removed from the top of the machine.

Each end of the casting which forms the frame or body of the machine has its sides extended downwardly, forming the depending flanges 13, and the ends are cast hollow and provided with internal guideways 14 which extend from the top of the frame to the ends of the said flanges. Within each guideway is arranged a wheel-yoke $c$, and within the arms 15 and 16 of the yoke is secured a shaft 18 upon which is journaled a wheel 19. An adjusting screw 20, connected at one end to the center of the yoke, extends upwardly through the guideway, and a nut $d$ (see Fig. 6) is threaded onto the screw. This nut is journaled within a split bearing $e$ which is bolted to the top of the frame. The nut has bevel gear teeth 21 on its upper end which mesh with a bevel gear 22, the latter being mounted upon a shaft 23 which is journaled in a bearing 24, made integral with or otherwise secured to one part of the split bearing $e$.

By applying a crank to the shaft 23 and rotating the same it will be seen that the nut $d$ may be turned and the screw, yoke and wheel may be raised or lowered with respect to the frame. In order to tilt the frame about its central transverse axis and cause one series of picks or the other to engage the ground, the wheel at one end of the frame is lowered and the wheel at the other end is raised.

For the purpose of locking the adjusting screws in any desired position, latches 25 are pivotally connected to the top of the bearing plates $e$, and these latches are adapted to be moved into engagement with the gear teeth upon the nuts and prevent their rotation.

Each adjusting nut has a recess 26 in its upper end, surrounding the screw, and adapted to receive oil or other lubricant. Oil poured into this recess will flow downward on the adjusting screw, lubricating the latter and the nut, and pass into a recess 27 in the top of the wheel-yoke. Oil ducts or passageways 28 extend downward from the recess 27 through the arms 15 and 16 of the yoke, and the fixed axle 18 has oil ducts 29, connecting through openings 30 at their outer ends with the passageways 28. Openings 31 at the inner ends of the ducts 29 admit the oil to the bearing surface of the wheel. Oil poured into the recess in the nut will, therefore, finally pass to the wheel and axle.

In practice road scarifiers of this general description, are usually drawn back and forth along the road which is to be scarified by means of a road roller or other traction engine which is connected by means of a chain first to one end and then to the other end of the scarifier, the chain having short branches which are suitably hooked to the sides of the scarifier at its ends. When the scarifier meets with an unusual obstruction, tending to throw it out of the line in which it is traveling, the pulling stress is thrown upon one branch of the chain, which has an unyielding connection with the frame, and the scarifier is thereby sometimes given a sudden lateral jerk which overturns it. In order to overcome this difficulty we provide curved draft-yokes 32, which are yieldingly connected, through springs 33 to the ends of the frame at its opposite sides, the curved portions of the yokes projecting in front of the frame so that the chain connected to the traction engine may be hooked over the yoke. The hook will adjust itself upon the yoke to the lateral movements of the end of the scarifier, and the pull of the chain will always be exerted on both sides of the frame through the arms of the yoke and the spring connections. By this arrangement the danger of overturning the scarifier is greatly lessened. The springs 33 are housed within sockets 34 bored longitudinally in side extensions 35 of the frame. The end portions of the yokes, as indicated in Fig. 5, extend through these sockets, and the springs 33 are arranged between nuts 36 upon the ends of the yokes and the inner ends of the sockets.

It will be noted that the yokes, carrying the adjustable wheels are rigidly supported against lateral thrusts by the parts of the frame in which the guideways are formed, and that, therefore, the adjusting screws are not subject to lateral strains.

Having thus described our invention what we claim and desire to protect by Letters Patent is—

1. In a road scarifier, the combination with an elongated metal body, supported centrally upon a transverse axle, and having an upright guideway at one end, of a cross-head movable within said guideway, a supporting wheel carried by said crosshead, an adjusting screw fixed non-rotatably to the crosshead and extending upwardly therefrom, and a nut journaled in a suitable bearing at the upper end of said guideway and fitting said screw.

2. In a road scarifier, the combination with an elongated metal body, supported centrally upon a transverse axle, and having an upright guideway at one end, of a crosshead movable within said guideway, a supporting wheel carried by said crosshead, an adjusting screw fixed non-rotatably to the crosshead and extending upwardly therefrom, a nut journaled in a suitable bearing at the upper end of said guideway and fitting said screw, said nut having gear teeth, and a shaft having a gear thereon adapted to engage said teeth.

3. In a road scarifier, the combination with an elongated metal body, supported centrally upon a transverse axle, and having an upright guideway at one end, of a crosshead movable within said guideway, a supporting wheel carried by said crosshead, an adjusting screw fixed to the crosshead and extending upwardly therefrom, a nut journaled in a suitable bearing at the upper end of said guideway and fitting said screw, said nut having gear teeth, a shaft having a gear thereon adapted to engage said teeth, and a latch adapted to engage the teeth on the nut.

4. In a road scarifier, the combination with an elongated metal body, supported centrally upon a transverse axle, and having an upright guideway at one end, of a crosshead movable within said guideway, a supporting wheel carried by said crosshead, an adjusting screw fixed to the crosshead and extending upwardly therefrom, a split bearing at the upper end of said guideway, a nut journaled in said bearing and fitting said screw, said nut having gear teeth on its upper end, a transverse bearing integral with one part of said split bearing, a shaft journaled upon said transverse bearing, and a gear upon said shaft engaging the teeth upon the nut.

5. A road scarifier comprising an elongated metal frame supported centrally upon a transverse axle and having an upright guideway at one end and picks arranged between said axle and said end, a wheel yoke movable in said guideway, a shaft secured in said yoke, a wheel journaled on said shaft, said yoke having a recess at its upper end adapted to receive lubricant, and passageways extending from said recess to the shaft, and said shaft having passageways leading from the passageways in the yoke to the wheel, an adjusting screw secured to said yoke and extending upwardly therefrom, and a nut journaled in a suitable bearing at the upper end of said guideway and engaging the screw.

6. A road scarifier comprising an elongated metal frame supported centrally upon a transverse axle and having an upright guideway at one end and picks arranged between said axle and said end, a wheel yoke movable in said guideway, a shaft secured in said yoke, a wheel journaled on said shaft, said yoke having a recess at its upper end adapted to receive lubricant, and passageways extending from said recess to the shaft, and said shaft having passageways leading from the passageways in the yoke to the wheel, an adjusting screw secured to said yoke and extending upwardly therefrom, and a nut journaled in a suitable bearing at the upper end of said guideway and engaging the screw, said nut having a recess at its upper end for receiving lubricant.

7. In a road scarifier, the combination with an elongated metal frame, main supporting wheels at its center, vertically adjustable wheels at its ends and picks between said central and end wheels, of a curved draft yoke arranged at each end of the frame, the end portions of each yoke being connected to the frame at opposite sides of its longitudinal axis.

8. In a road scarifier, the combination with an elongated metal frame, main supporting wheels at its center, vertically adjustable wheels at its ends and picks between said central and end wheels, of a curved draft yoke arranged at each end of the frame, the end portions of each yoke being connected to opposite sides of the frame, and springs interposed between the ends of the yoke and the frame.

9. In a road scarifier, the combination with an elongated metal frame, having at each end two longitudinally extending sockets, located respectively at opposite sides of the frame, of a curved draft yoke at each end of the frame having its end portions within said sockets, and springs upon said end portions, within the sockets.

10. A road-scarifier comprising an elongated metal frame having a tool or ballast box in its central portion, the ends of said box sloping downwardly towards the ends of the frame, cross-bars, adapted to hold picks, arranged between the ends of the box and the ends of the frame, main supporting wheels at the center of said frame, and vertically adjustable wheels at the ends of the frame.

11. A road-scarifier comprising an elongated metal frame having a tool or ballast box in its central portion, the ends of said box sloping downwardly towards the ends of the frame, cross-bars, adapted to hold picks, arranged between the ends of the box and the ends of the frame, said cross-bars extending laterally beyond the sides of the box, main supporting wheels at the center of the frame, and vertically adjustable wheels at the ends of the frame.

12. A road-scarifier comprising an elongated metal frame having a tool or ballast box in its central portion, the ends of said box sloping downwardly towards the ends of the frame and also converging laterally, cross-bars, adapted to hold picks, arranged convergently between the ends of the box and the ends of the frame, main supporting wheels at the center of said frame, and vertically adjustable wheels at the ends of the frame.

13. A road-scarifier comprising an elongated metal frame, main supporting wheels at the center of the frame, and adjustable wheels at its ends, said frame having a cross-bar at each side of its central axis, each cross-bar having a series of openings therethrough adapted to receive picks and also having a series of keyways therethrough connected with said openings by contracted passageways, and keys within said key-ways, said keys having stops at their ends.

In testimony whereof we affix our signatures, in presence of two witnesses.

EDWARD T. WRIGHT.
CHARLES LONGENECKER.

Witnesses:
HERBERT GIVIN,
JACOB A. BEAUJON.